United States Patent
Furtwangler et al.

(10) Patent No.: US 10,275,236 B2
(45) Date of Patent: Apr. 30, 2019

(54) GENERATING RELATED TEMPLATED FILES

(71) Applicant: Home Box Office, Inc., New York, NY (US)

(72) Inventors: Tyler R. Furtwangler, Sammamish, WA (US); Brendan Joseph Clark, Seattle, WA (US); Brandon C. Furtwangler, Issaquah, WA (US)

(73) Assignee: Home Box Office, Inc., New York, NY (US)

( * ) Notice: Subject to any disclaimer, the term of this patent is extended or adjusted under 35 U.S.C. 154(b) by 59 days.

(21) Appl. No.: 14/843,904

(22) Filed: Sep. 2, 2015

(65) Prior Publication Data

US 2016/0070567 A1    Mar. 10, 2016

Related U.S. Application Data

(60) Provisional application No. 62/046,081, filed on Sep. 4, 2014.

(51) Int. Cl.
*G06F 8/30* (2018.01)
*G06F 8/71* (2018.01)
*G06F 11/36* (2006.01)

(52) U.S. Cl.
CPC ............... *G06F 8/71* (2013.01); *G06F 8/30* (2013.01); *G06F 8/315* (2013.01); *G06F 11/3672* (2013.01)

(58) Field of Classification Search
None
See application file for complete search history.

(56) References Cited

U.S. PATENT DOCUMENTS

| | | | | |
|---|---|---|---|---|
| 7,340,719 B1* | 3/2008 | Bakerman | .................. | G06F 8/70 717/106 |
| 7,653,893 B2* | 1/2010 | Neumann | .................. | G06F 8/71 713/100 |
| 7,913,230 B2* | 3/2011 | Vikutan | .............. | G06F 11/3688 717/124 |

(Continued)

OTHER PUBLICATIONS

Buse et al. "Automatically documenting program changes." Proceedings of the IEEE/ACM international conference on Automated software engineering. ACM, 2010. Retrieved on [Dec. 4, 2018] Retrieved from the Internet:URL<https://dl.acm.org/citation.cfm?id=1859005> (Year: 2010).*

(Continued)

*Primary Examiner* — Thuy Dao
*Assistant Examiner* — Cheneca Smith
(74) *Attorney, Agent, or Firm* — Amin, Turocy & Watson, LLP

(57) ABSTRACT

The described technology is directed towards generating related templated files based on a set of data associated with to another class registered with a document system. These files may be edited into a source code file, a document file and a test file for any derived class. At runtime, which may include the runtime execution of the object based upon the test file, an object based upon the source code file is instantiated. Part of the object (e.g., a function) may be validated during the runtime based upon validation information in the document file.

19 Claims, 11 Drawing Sheets

(56) References Cited

U.S. PATENT DOCUMENTS

| | | | |
|---|---|---|---|
| 8,448,130 B1* | 5/2013 | Pillarisetti | G06F 8/447 |
| | | | 717/104 |
| 9,170,919 B2* | 10/2015 | Shim | G06F 11/3624 |
| 2003/0084063 A1 | 5/2003 | Delmonaco et al. | |
| 2006/0200803 A1* | 9/2006 | Neumann | G06F 8/71 |
| | | | 717/120 |
| 2007/0033442 A1 | 2/2007 | Tillmann et al. | |
| 2007/0240127 A1* | 10/2007 | Roques | G06F 8/315 |
| | | | 717/136 |
| 2008/0155690 A1* | 6/2008 | Broshy | G06F 21/64 |
| | | | 726/22 |
| 2008/0184206 A1* | 7/2008 | Vikutan | G06F 11/3688 |
| | | | 717/127 |
| 2008/0189679 A1* | 8/2008 | Rodriguez | G06F 8/34 |
| | | | 717/105 |
| 2012/0017119 A1* | 1/2012 | Ghosh | G06F 11/3684 |
| | | | 714/38.1 |
| 2012/0159420 A1* | 6/2012 | Yassin | G06F 11/3672 |
| | | | 717/101 |
| 2013/0152047 A1* | 6/2013 | Moorthi | G06F 11/368 |
| | | | 717/124 |
| 2015/0347128 A1* | 12/2015 | Frenkiel | G06F 8/73 |
| | | | 717/123 |

OTHER PUBLICATIONS

Ying, Annie TT, et al. "Predicting source code changes by mining change history." IEEE transactions on Software Engineering 30.9 (2004): 574-586.Retrieved on [Dec. 4, 2018]. Retrieved from the Internet:URL<https://ieeexplore.ieee.org/stamp/stamp.jsp?tp=&arnumber=1324645> (Year: 2004).*

International Search Report and Written opinion from International Patent Application Serial No. PCT/US15/48394, dated Nov. 25, 2015, 13 pages.

Dave Thomas; et al: "Mock Objects," May 31, 2002, 4 pages.

* cited by examiner

GENERATING RELATED TEMPLATED FILES

CROSS-REFERENCE TO RELATED APPLICATION

The present application claims priority to U.S. provisional patent application Ser. No. 62/046,081, filed Sep. 4, 2014, the entirety of which is incorporated herein by reference.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer program development can be a very difficult task when dealing with a large project. With a large project, there is a significant amount of coding that needs to be done, followed by testing and debugging. This typically leads to frequent changes, new enhancements and the like.

One of the things program developers do to keep a program organized is to start with a more general type, e.g., a base class, and inherit from that class. In prototypal object systems such as JavaScript®, new objects may be derived from prototypes.

With large projects, this leads to a relatively large number of files. Typically this includes a mix of source code with documentation in the form of comments therein. There also may be code written to test the source code. Inconsistencies among the many files in a relatively large project, along with the need to check for the proper setup/teardown or definition syntax in the files can make working on a project a very cumbersome task.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards a templated file generator that generates a related source code template file, document template file and test template file from a set of data associated with another class registered with a document system. The document system registers a source code file comprising an edited version of the source code template file, a document file comprising an edited version of the document template file, and a test file comprising an edited version of the test template file. A test file template and corresponding test file may also be generated and registered, respectively.

At runtime, which may include a runtime execution of the object based upon the test file, an object based upon the source code file is instantiated. Part of the object (e.g., a function) may be validated during the runtime based upon validation information in the document file.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
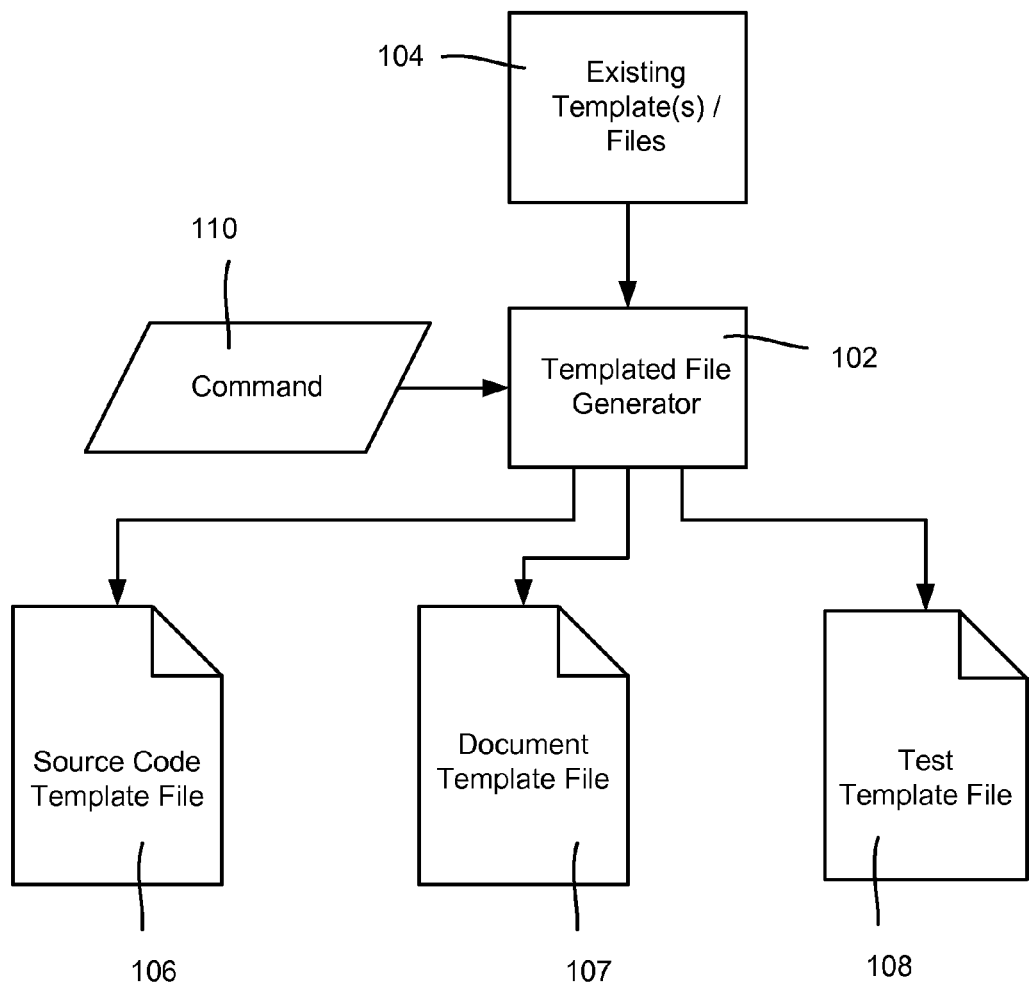
FIG. 1 is a block diagram representing example components that may be used to generate related templated files with respect to one or more sets of class-related data, according to one or more example implementations.

Various aspects of the technology described herein are generally directed towards automatically generating and using separate files for separating out the responsibilities of a program class/object. In one or more implementations, this includes a source code file, and a document file, e.g., comprising a JavaScript® Object Notation (JSON) object. At least one other file may be generated and used, including a test file.

In general, the files are uniformly formatted. The source code files contain only source code, plus typically some relatively very minor comments regarding the details of the implementation of the source code (e.g., those required for understanding the code, but not verbose documentation).

The document files describe in relatively significant verbosity the details on the class/methods/properties/functions/events/and so forth. A document file may be processed into more human-readable documentation. Further, a document file may, for example, contain validation for each function input parameter and each of the function's return value(s). For example, after instantiation of an object from the class, during runtime a validation function may be optionally run (such as based upon condition data set by a developer or test). As a more particular example, before executing a function, a validation function (and/or set of statements) may test whether the input value to the function is of type number and also is a valid value for that function (e.g., falls within a certain specified range such as between zero and one-hundred). If this "pre-validation" passes, the function is run, and its output return value(s) similarly validated, (e.g., is of type string and is four characters in length). An object's properties, events, and so on may be similarly validated.

The test file tests the implementation of its corresponding source file, and generally when run alone results in complete code coverage on the source file. For example, this test file may mock out the implementation of everything else (the other program objects) except the object corresponding to the source code file it is testing. This may be done via mock objects, where in general, a mock object is a simplified version of its counterpart real object that implements the real object's interfaces, such that any call to an interface of the mock object is properly supported from the perspective of the caller. In addition to supporting the same interfaces, a mock object may be automatically generated or otherwise configured to more closely mock the real object, such as to provide return values in the format expected by the caller, e.g., a string when the calling object expects a string in return, a number when expected, and so on.

Note that the terms "file" or "files" as used herein are not limited to conventional file system files, (although file system files are used in one or more implementations), but rather represent any suitable data structure for containing the various sets of information. For example, a single conventional file system file may have multiple parts, one for source code, one for the document data (the JSON object) and for test files. Such a single conventional file system file may be divided into memory as needed.

Because of the clear separation of responsibility among the different kinds of files, the format of each file is well understood, and is thus uniform. This allows automatically generating the source and document (and optionally test) files for any new type based off of an existing template or templates. The multi-file generation may be done with a single command in one or more implementations. The input to such a command takes in information about the type (type namespace and class name, base type, and so forth). Based on the input, the command is able to produce related template files using the existing template (or templates) for that type with as much detail that each can contain. The developer may then edit each template as needed into the desired files for the derived class/object.

The source file includes the namespace and class name, and defines the type. The source file pulls in any required base type, and defines the source file's type as deriving from the base type. The source file may include any appropriate constructor/singleton/static definitions.

The document file includes the namespace and class name, and provides placeholders for descriptions to be added by the developer. The document file may include base type documentation information (e.g., a reference to the base file's document file), and constructor/singleton/static documentation information.

The test file describes test setup and teardown. The test file may include generic per-type tests (e.g., the same test for each type to ensure that the type is correctly registered in the document system with a correct type namespace and class name). The test file also may include validation against its base type, e.g., to ensure that the type has correctly derived from the base type, has implemented the correct interfaces, and so on.

It should be understood that any of the examples herein are non-limiting. For instance, "classes" may be defined using conventional object-oriented programming (OOP) concepts such as class hierarchies, interfaces, and static methods and properties, with the classes used at runtime by an OOP system to instantiate JavaScript® objects (an OOP system is configured to do this even though JavaScript® does not have classes). However, JavaScript® is only used as an example of one prototypal and dynamically typed programming language that benefits from the technology described herein; the technology may apply to any such programming language. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used various ways that provide benefits and advantages in computing and programming in general.

FIG. 1 shows a file generator 102 using one or more existing templates 104 (and/or existing files) to generate a source file 106, a document file 107 and a test file 108. The file generator 102 takes in a command 110 that specifies information about the type, e.g., including type namespace and class name, base type, interfaces and so forth. Based on the input in the command, the generator produces the files 106-108 using the templates for that type with the detail that is known from the existing templates/existing files, e.g., the files for the base class.

By way of example, the following source code file may be generated (as a template) from the source file of the existing base class/its template:

Example Generated Source Code File (Template):

```
(function ( ) {
    "use strict";
    define([
        "core/oop",
        "test/basetype"
    ],
    function (
        oop,
        basetype
    ) {
        return oop.classDef("test.testtype", basetype, function ($super)
    {
            oop.constructor(function ( ) {
                $super.$ctor.apply(this, arguments);
            });
            oop.properties({
            });
            oop.events([
            ]);
            oop.methods({
            });
        });
    });
})( );
```

Further in this example, the following document file template may be generated from the document file of the existing base class/its template:

Example Generated Document File (Template):

```
(function ( ) {
   "use strict";
   define(["core/docs"],
   function (docs) {
      docs.registerDoc({
         namespace: "test",
         className: "testtype",
         baseClass: "test.basetype",
         description: " ",
         constructors: [
            {
               description: " ",
               params: [
                  {
                     name: " ",
                     description: " ",
                     validation: undefined // e.g., function(s) to type check / value check
                  }
               ]
            }
         ],
         properties: [
            {
               name: " ",
               description: " ",
               validation: undefined // e.g., function(s) to type check / value check
            }
         ],
         events: [
            {
               name: " ",
               description: " "
            }
         ],
         methods: [
            {
               name: " ",
               description: " ",
               params: [
                  {
                     name: " ",
                     description: " ",
                     validation: undefined // e.g., function(s) to type check / value check
                  }
               ]
            }
         ]
      });
   });
})( );
```

Note that although not shown in these template examples, placeholder(s) for the description of any inherited/implemented interface may be included in the document template. Similarly, stubs for inherited interfaces may be automatically inserted into the source code file template.

Still further in this example, the following test file template may be generated from the test file of the existing base class/its template:

Example Generated Test File (Template):

```
(function ( ) {
   "use strict";
   define([
      "test/testtype",
      "test/basetype",
      "TestUtil"
   ],
   function (
      testtype,
      basetype,
      TestUtil
   ) {
      describe("test/testtype", function ( ) {
         TestUtil.init( );
         TestUtil.standardTypeTests(testtype, basetype, "basetype", false /*ignoreNew*/,
false /*isSingleton*/);
      });
   });
})( );
```

Note that the test file may specify (or imply) other objects to mock out during testing, as well as possibly objects to leave intact, e.g., to test combinations of objects. Further, a test may intentionally include negative test cases with bad data as well as positive test cases to make sure the object properly operates in both situations.

With these templated files, a developer has a solid basis for editing the files into actual files that are to be used in the program and program testing. As described herein, the files may be registered into a document system that manages file relationships, maintains the files in appropriate (logically arranged) folders, and so on. The templated files may be automatically registered with the document system, and/or actual files, edited based upon the templated files, may be registered with the document system. Note that some validation may be performed as part of registration, and thus a file may be "registered" but not validated until the file meets validation requirements.

Figure 2:
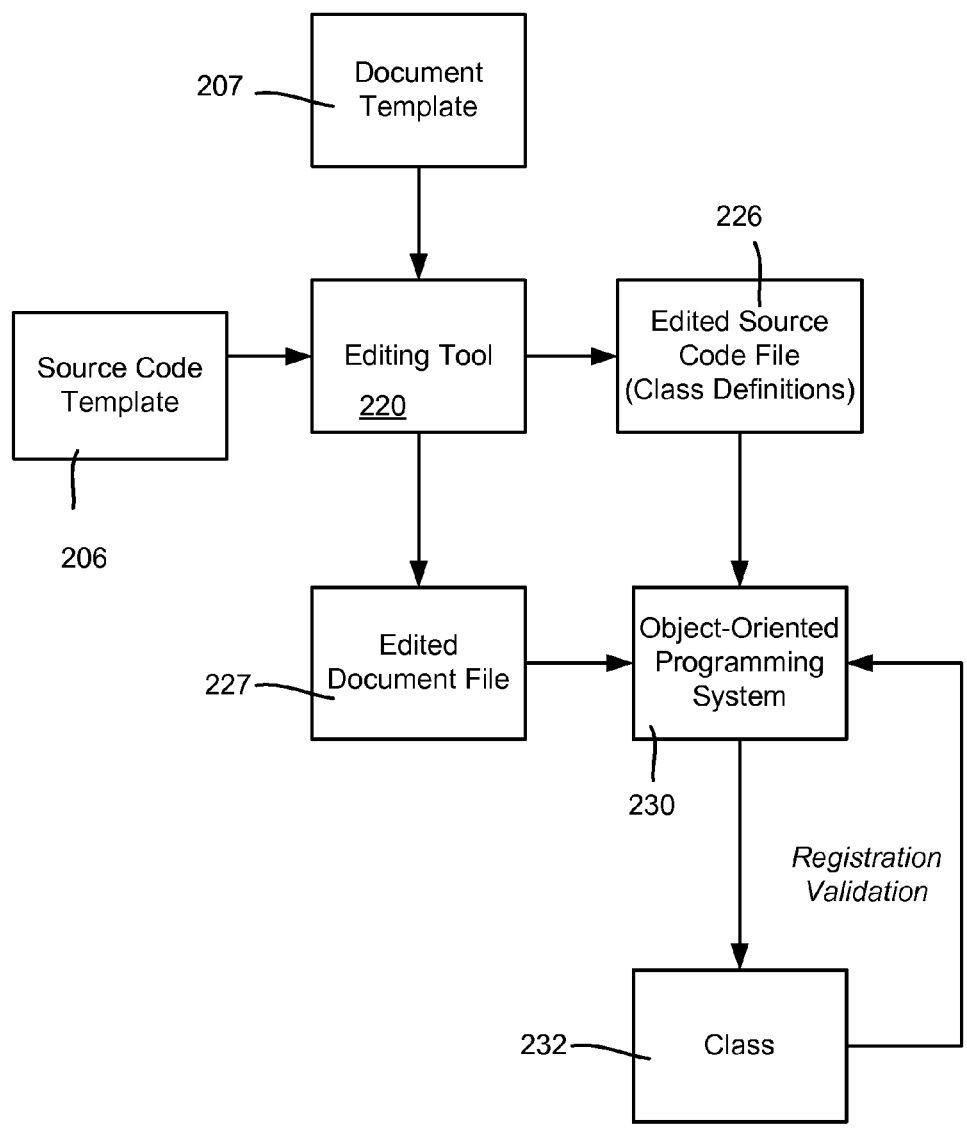
FIG. 2 is a block diagram representing example components that may be used to edit templated files into source code and document files associated with a class/object, according to one or more example implementations.

FIG. 2 shows the concept of editing template files including a source code template file 206 and the document template file 207, e.g., via any suitable text editor tool 220 or the like. Generation of a test template file may or may not be performed in some implementations; for brevity FIG. 2 does not show such a test file, although it is understood that a test template file may likewise be generated and edited as desired.

Following editing, an edited source code file 226 comprising actual class definitions is prepared for use in the overall system. Note that this does not mean that the source code file 226 is fully ready, let alone tested and/or debugged, and indeed, a developer may go back and edit the edited source code 226 file numerous times until it executes properly.

Similarly, an edited document file 227 is prepared for use. Again, such a file may need further editing/multiple revisions to get it correct.

Once the source code file 226 and document file 227 are ready, at least to the extent that the class 230 (e.g., created via an object-oriented programming system 230) passes registration validation and/or other generic validation, the source code file 226 and document file 227 can be tested/debugged during a runtime execution of an object corresponding thereto as described herein. The test file for the object, including one automatically generated, may be used for this purpose.

Figure 3:
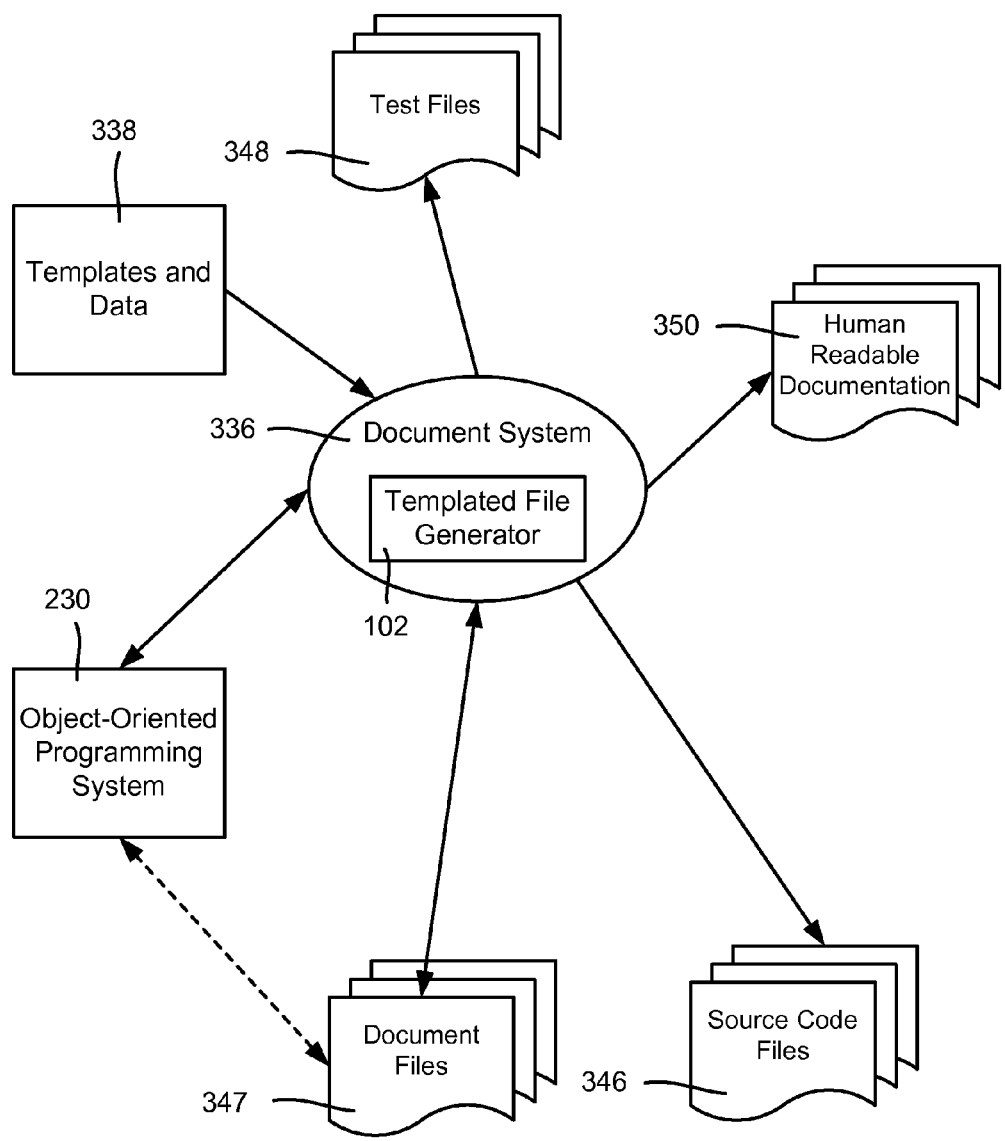
FIG. 3 is a block diagram representing example components that may be used to register class/object-related files with a document system, according to one or more example implementations.

FIG. 3 shows various aspects of the technology described herein, including a document system 336 with which the various templates and data 338 may register and/or files 346-348 are registered. The document system 336 includes or is coupled to the template file generator 102 and includes or is coupled to the object-oriented programming system 230. As set forth above, more human-readable documentation 350 may be output by the document system, possibly with the assistance of a tool such as the well-known YUIdoc tool.

In one or more implementations, each document file is a JSON object that registers with the document system 336. Note that for registration, JSON files may include soft-referenced links to existing code, or, in one more implementations, executable code that uses a JavaScript object (with executable functions) may register the document file. The other files for an object are also registered. An object being registered also may reference other entities not yet in existence. If so, the document system 336 maintains information regarding these linked entities, so that the document system 336 may link them to the entity or entities when they do exist.

As part of registration, registration validation may occur, in which the document system runs a registration validation/a generic validation that does not need the object to be instantiated. To this end, some (non-runtime) validation may be performed, e.g., when a document/JSON object is registered with the system. For example, consider that the document indicates that it describes an object that derives from a base class (in the OOP system) and implements an interface. It may also include property values, arrays, specify a singleton or collection, events and so on. A registration validation function or the like may be invoked at the time of registration to ensure that the object is properly defined, e.g., the named base class exists, and so on. Registration validation also may validate that the object properly implements the functions of the base class, and so on.

When registering a document file, the document file provides its fully qualified name, along with a breakdown of its methods, properties, events and so on, essentially to describe everything registered on that object. The documentation system walks through the document file to find (e.g., JSON object) its name, and may find something like a properties array with a start method and validation property, which is a function that checks an argument and returns true if the proper type, e.g., Boolean. The document system 336 records that on the fully qualified name, there is such a start property, and so on. This is done for all types that can register.

Note that any time a source code file document file and/or test file is edited, validation by the document system may be performed again. This helps maintain the system, e.g., an edit to a source code file may necessitate that the document file be updated as well; validation upon the update (as well as during runtime) keeps such files consistent with each other.

Figure 4:
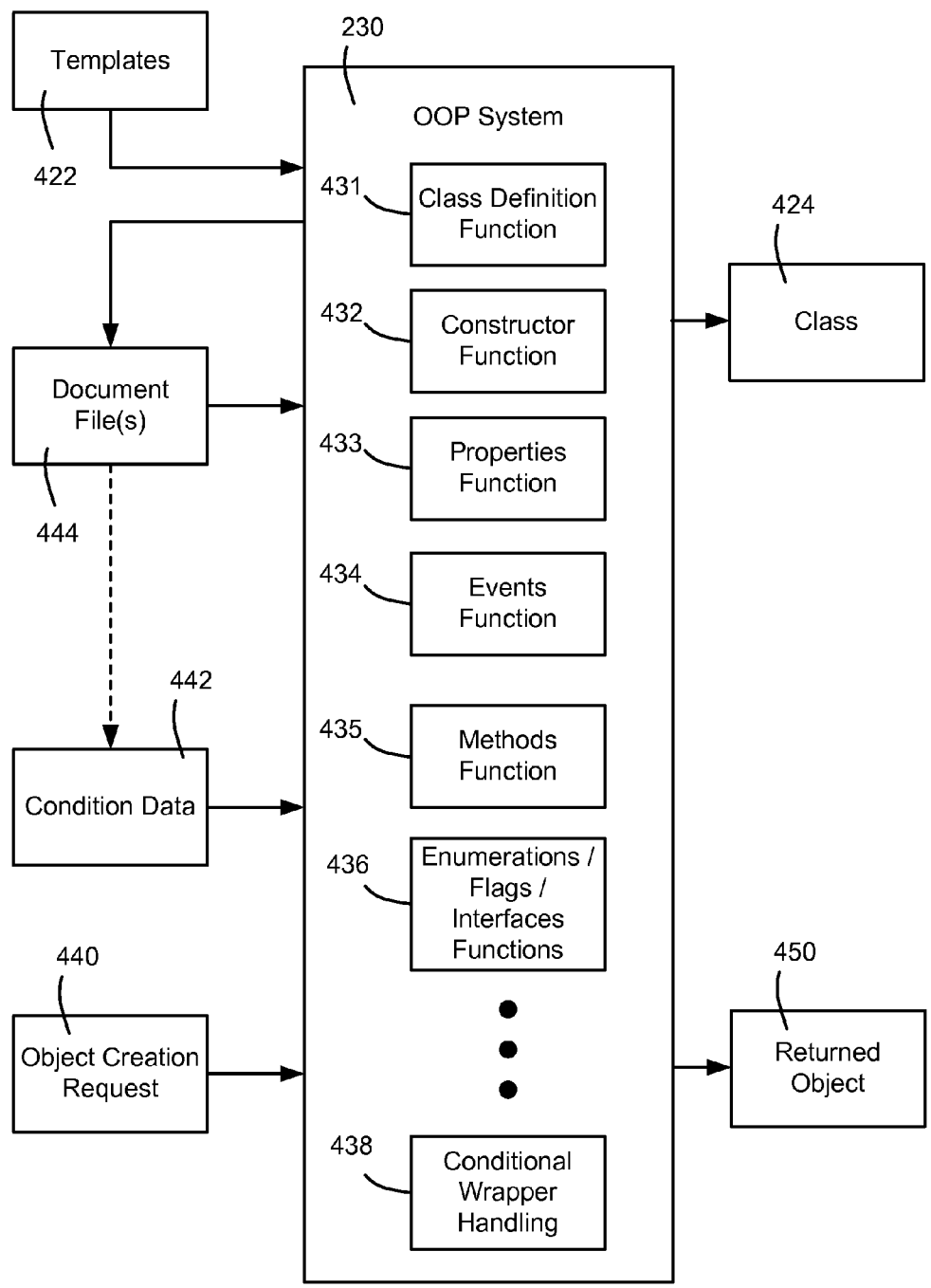
FIG. 4 is an example representation of an object oriented programming (OOP) system that may be used for creating a class from a source code file, and instantiating an object instance from the class, including with a selectable validation wrapper, according to one or more example implementations.

As described herein with reference to FIG. 4, in one or more implementations the object-oriented programming system 230 includes various functions related to creating an object including creating a class 424 representing the various parts therein, e.g., a constructor/(or singleton), properties, events, methods and so on. For example, in FIG. 4 the OOP system 420 takes in a source template 422 (e.g., corresponding to class definitions) and produces a class 424, from which an object may be instantiated upon request.

To produce the class 424 representing the object, the exemplified OOP system 420 includes a library comprising various functions, including a class definition function 431, constructor function 432, properties function 433, event function 434, methods function 435 and other functions, e.g., functions 436 that support other object-oriented features such as enumerations, flags, interfaces and so on. Conditional wrapper handling code 438 for conditionally adding wrapper logic to the object as described herein also may be provided, to add wrapper logic (or not) based upon condition data 442.

For example, the OOP system 230 supports the concept of an enumeration, comprising a set of values that are related, e.g., and may be checked during runtime validation. As a more particular example, consider that a function gets an HTTP status code as input. As is known, this is a limited, non-contiguous set of values. During validation, the value input to a function may be checked against an enumeration containing the HTTP status codes to ensure that the input is valid.

Figure 5:
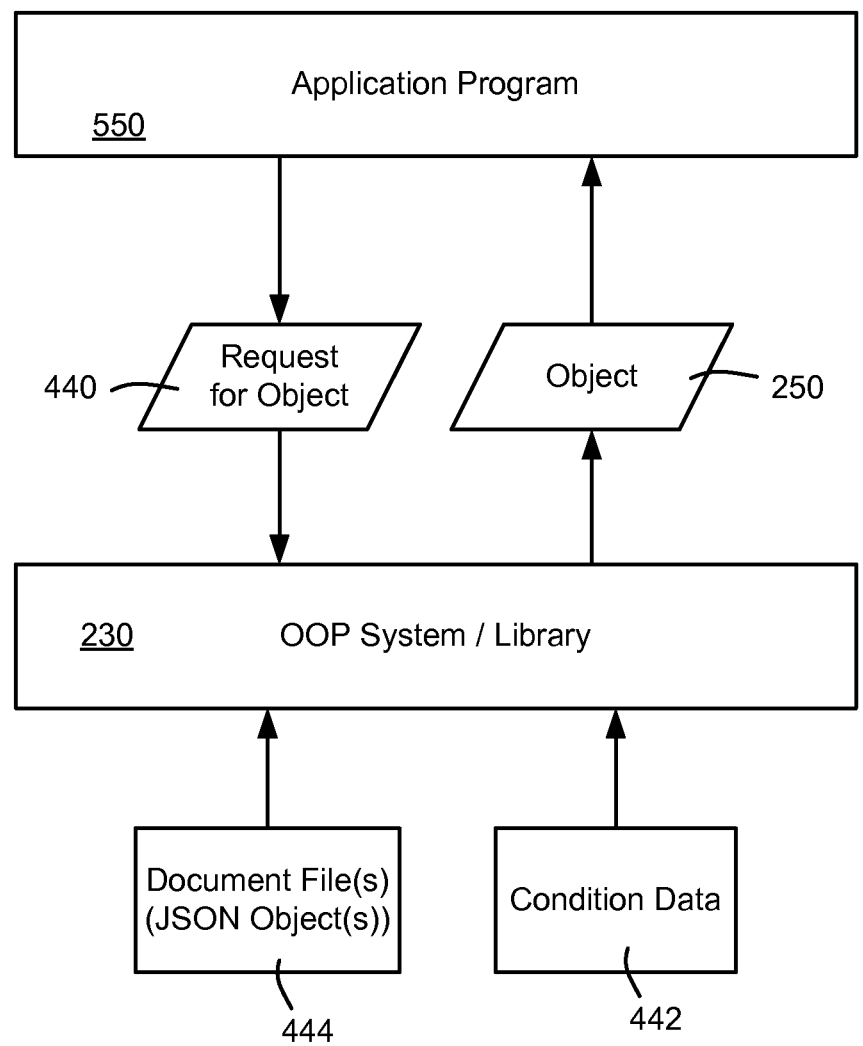
FIG. 5 is an example representation of an object oriented programming (OOP) system instantiating an object instance from a class at runtime, including with a selectable validation wrapper, according to one or more example implementations.

With respect to runtime validation, as generally represented in FIG. 5, at a runtime for development/testing/debugging purposes (e.g., not the production build runtime where the objects are established for each production version of the program), when an object creation request 440 (FIGS. 4 and 5) comes in to the OOP system 230 from an application program 550, the condition data 442 is used to determine whether to add conditional wrapper logic to the object, such as for validation. Some of the condition data 442 may be specified in the document file or files 444 associated with the object being requested, as well as the validation and tracing-related data, e.g., which validation functions to perform. Some of such information may be maintained in a separate file or other data structure associated with the object. For example, a tester may specify that all functions within an area of a program that perform some program task (e.g., handles network communication) be validated; the validation function/statements to use are identified in each function's document file(s), but the tester need only provide such information to the OOP system once (e.g., identify an object namespace that identifies the objects that handle network communication) in order to turn on validation for those functions.

In general, in creating the object 450, the OOP system 230/conditional wrapper handling code 438 (FIG. 4) uses the condition data 442 to decide whether or not to wrap the object, and if wrapping is determined, how to wrap the object, such as with validation (and/or other added functionality such as tracing). The requested object is thus returned as the returned object 450, whether wrapped or unwrapped.

Validation may be applied to functions and properties, e.g., by identifying validation functions (and/or validation code statements) in the document file(s) 444 for an object that are invoked when validation is turned on for those object parts. Validation during runtime is further described herein with reference to FIGS. 9 and 10.

Turning to another aspect, multiple versions of the same general file/type can be produced at the same time or generally the same time, each with its own unique attributes. For example, this process can be used to generate a version of a file for multiple different platforms; (note that while much of JavaScript® objects are reusable across platforms, some similar but slightly different objects may be needed to interface those platform-independent objects with a specific platform). Thus, there may be a browser-specific version of a file, as well as an iOS® one, Android® platform one, and so on). Each separate file can share the required bits common to each, and thereafter give a starting point/template for the implementer to build off of.

Figure 6:
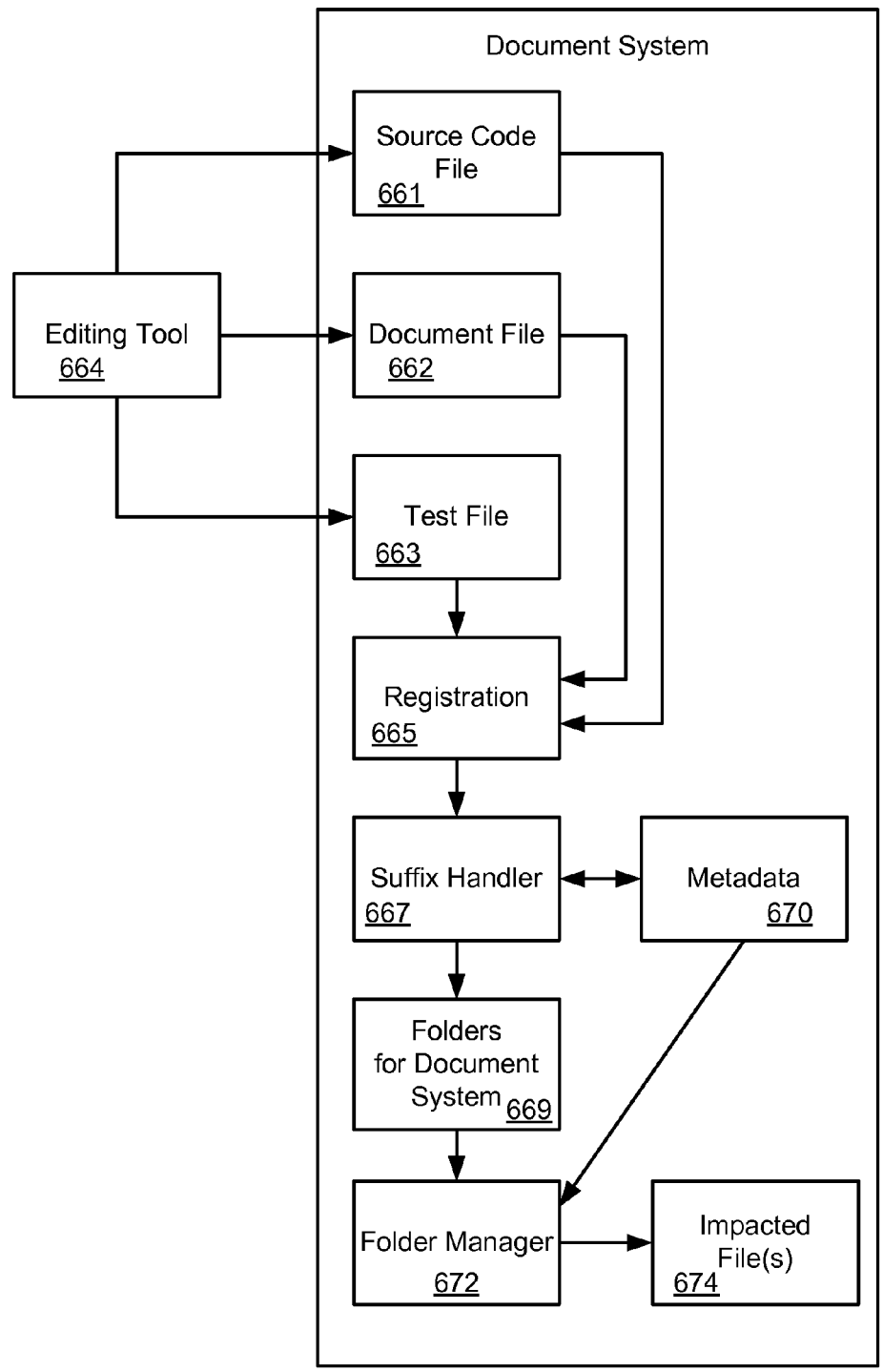
FIG. 6 is an example representation of components of a document system, according to one or more example implementations.

To this end, as represented in FIG. 6, when a source code file 660, document file 661 and/or test file 662 are edited into a new version by a suitable editing tool 664, registration 665 is performed, (including registration validation). A suffix handler 667 may be used to ensure that a correct file suffix is appended to each file for this (e.g., XB1 for an Xbox® One) version; note that the "suffix" may be at the very end of the fully qualified file name or near the end, e.g., a source file may be named something like "\ . . . \XB1.src" or "\ . . . \src.XB1". Further, the suffix handler 667 may automatically put the files into a correct folder structure 669, e.g., in a source code folder, document folder and test folder, respectively, as well as possibly track metadata 670 for the files, so that, for example, a developer can retrieve all XB1 version files at once from each folder in the structure.

Files being created in this versioned way can impact other files as well. If, for instance, there are container module files that reference all files within a certain namespace/folder structure, then creation of a file within that namespace/folder structure needs to update the existing module file that references it. This can be done automatically at creation time, e.g., by a folder manager 672 that notifies each impacted file 674 when a file is created.

Figure 7:
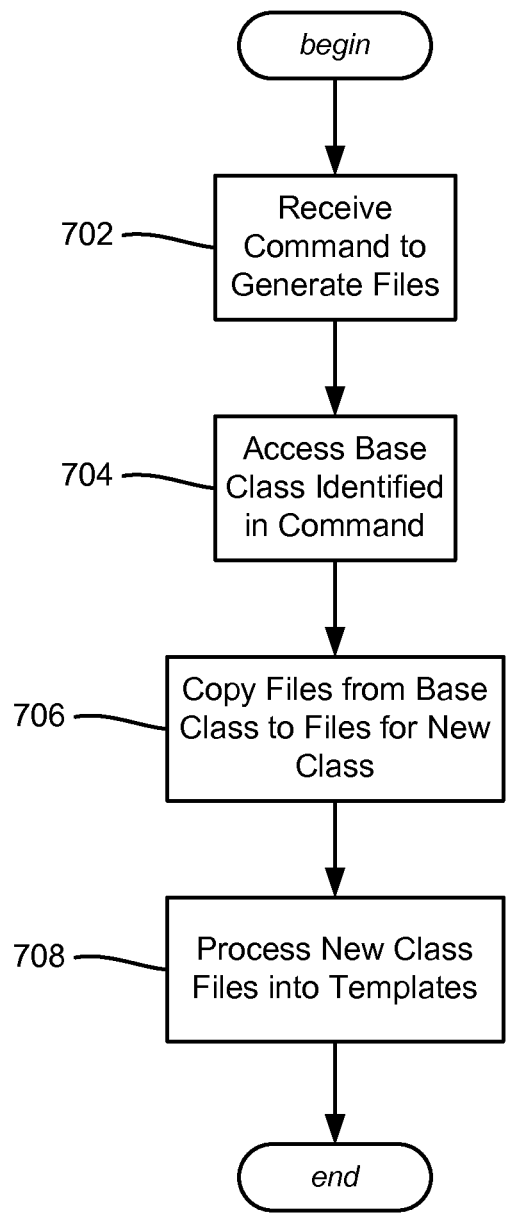
FIG. 7 is a flow diagram showing example steps related to generating related template files, according to one or more example implementations.

FIG. 7 is a flow diagram showing example steps related to generating the templated files, beginning at step 702 where the command to generate is received. Step 704 accesses the related files, e.g., the base class files/templates for those files identified in the command, which are copied to the new class name at step 706. Step 708 represents processing the newly generated files, e.g., stripping any information therefrom that is known to be in the base class, adding stubs and placeholders and so on, e.g., to provide a generic template plus possibly some information that is known (e.g., via the command parameters) to be used in the new class.

Figure 8:
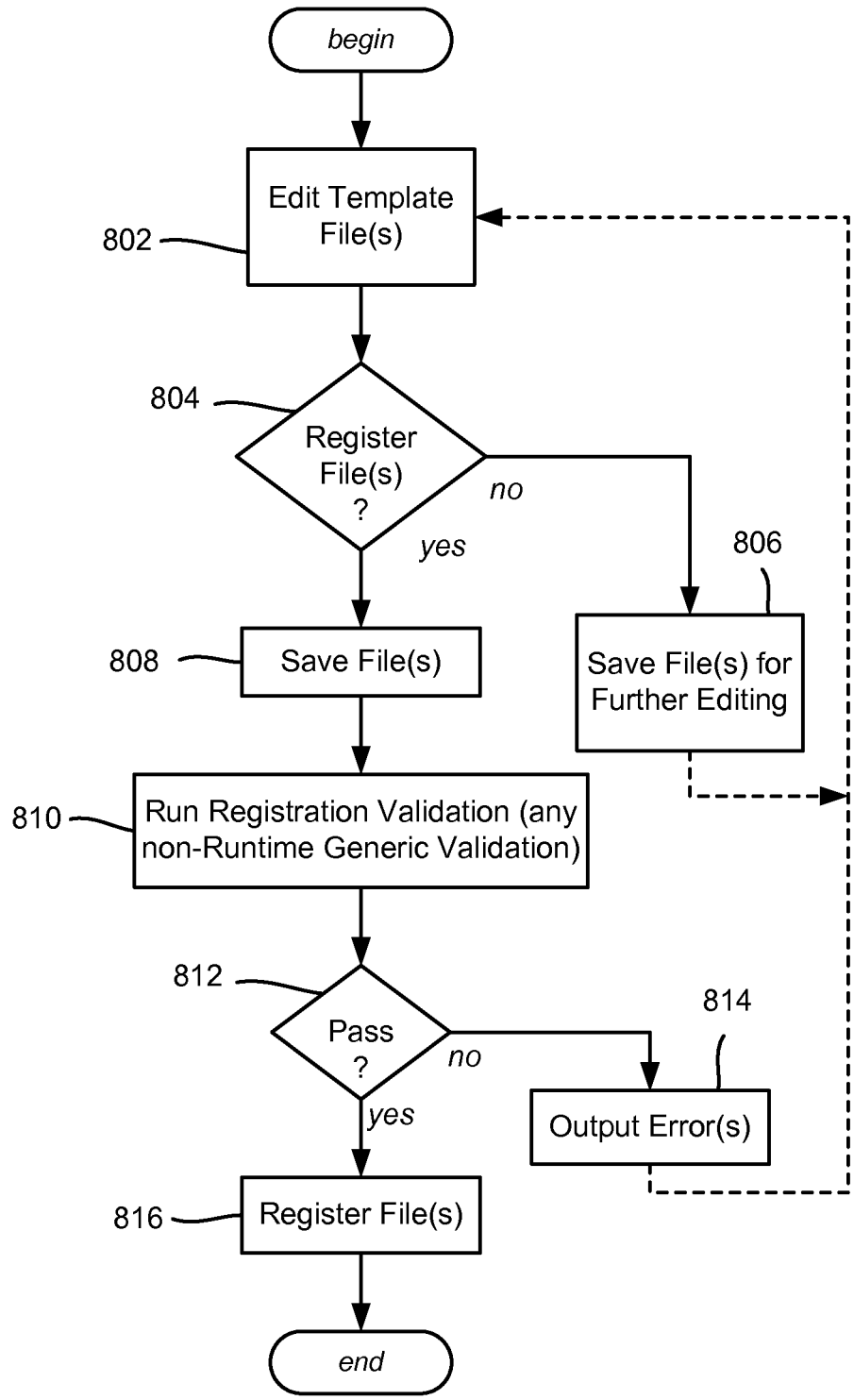
FIG. 8 is a flow diagram showing example steps related to registering files edited from the template files, according to one or more example implementations.

FIG. 8 is a flow diagram showing example steps related to registering a file or set of files, beginning at step 802 where the files are edited. The developer decides whether to attempt to register these files (step 804), which includes validation, or if not, can save the files as needed for further editing (step 806).

Eventually the developer believes the files are sufficiently ready to pass registration validation, and thus attempts to register the files, which includes saving the files (step 808) any running registration validation at step 810. This may include any generic validation or pre-runtime validation, including as specified in the document file or test file.

If validation does not pass at step 812, one or more errors are output at step 814 to inform the developer of the problem so that further editing can correct the issue. If validation passes, step 816 registers the file or files with the document system, meaning such files may now be used during runtime evaluations.

Figure 9:
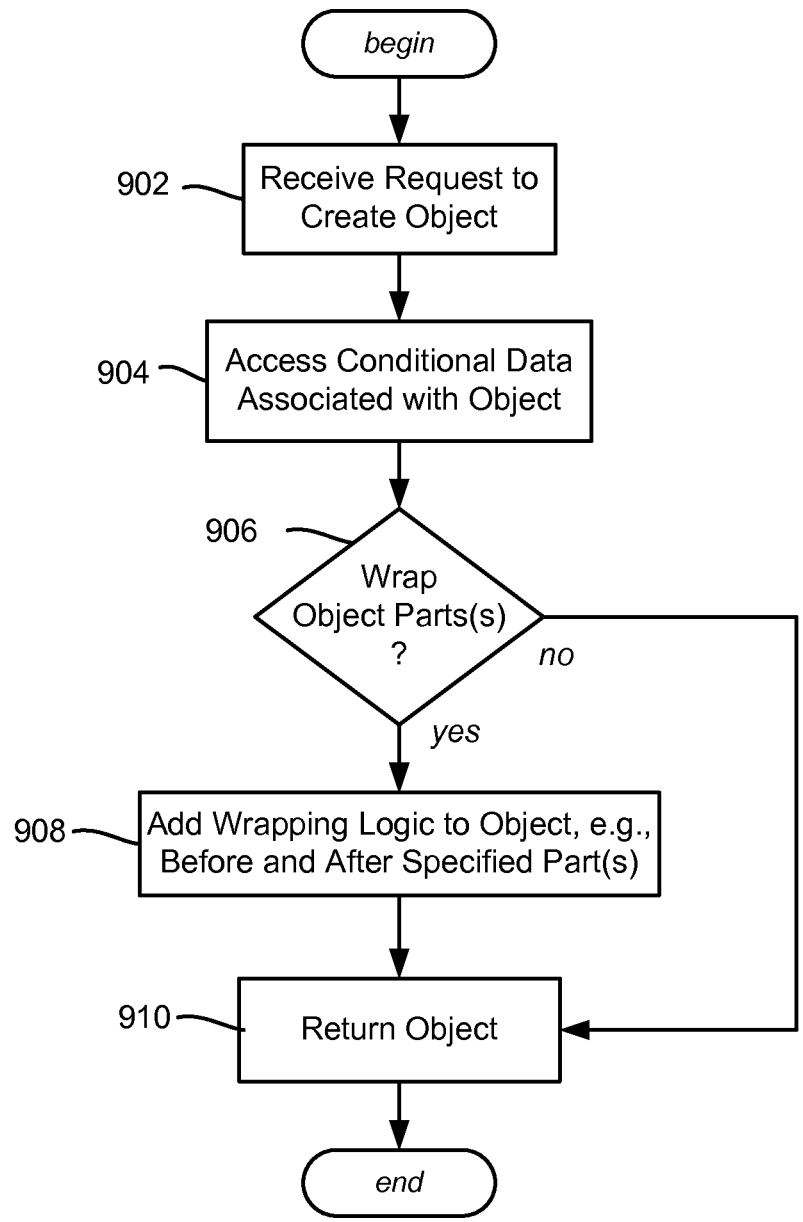
FIG. 9 is a flow diagram showing example steps that may be taken to wrap an object with validation code, according to one or more example implementations.

FIG. 9 is a flow diagram having example steps directed towards creation of an object from a class at runtime (including at the start of or during runtime), beginning at step 902 where an object creation request is received. As described herein, instead of simply instantiating and returning the object instance, at step 904 the OOP system accesses conditional data that determines (step 906) if—and if so, how—the object parts are to be wrapped with additional functionality, such as for validation. This may include accessing the document file or files associated with the class, including for example a document file for a class from which this class derives. If wrapped, step 908 represents performing the addition of the logic, which may include before and after validation operations as specified in the document file associated with the class/object.

Step 910 returns the object to the requesting application program or the like. Note that the unwrapped version is returned when no additional functionality is requested, so as to provide maximum performance of the object.

Figure 10:
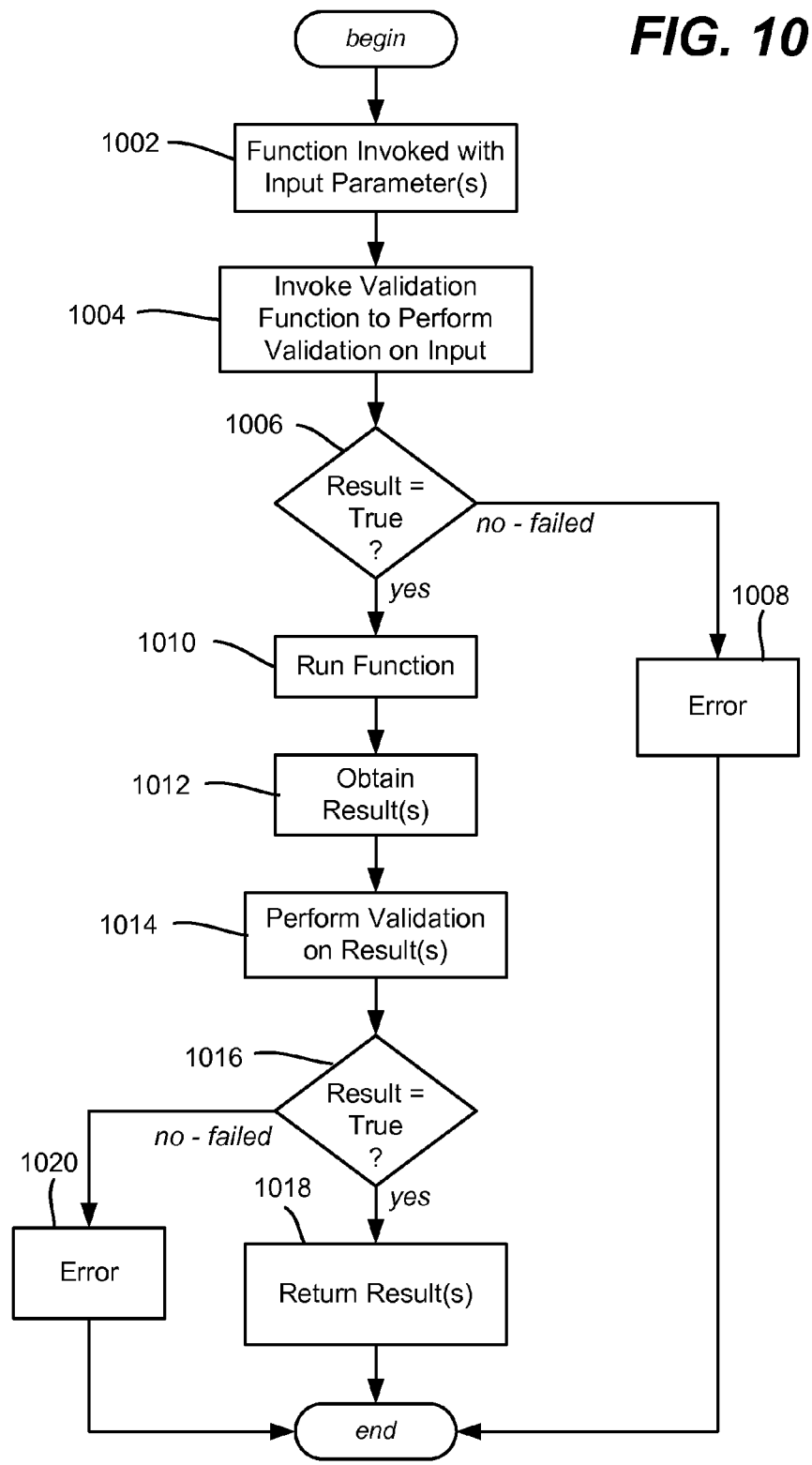
FIG. 10 is a flow diagram showing example steps that may be taken to validate an object function during runtime, according to one or more example implementations.

FIG. 10 is directed towards validation during runtime execution of the object, using the example of validating a function of the object. For any function, there are typically two phases of validation, namely pre-validation that checks the input parameter(s) as adhering to the function's input requirements, and post-validation that checks the returned value(s) as meeting the function's output requirements. Note that the function (ordinarily) is not allowed to run unless pre-validation passes; (although it is feasible to allow a function to proceed, such as to test how a function handles bad input).

Thus, when a wrapped function is invoked with one or more input parameters (step 1002), validation of the input is performed, as represented by step 1004. In one or more implementations, this involves accessing (directly or indirectly) pre-validation information in the document file (JSON object) associated with the wrapped object that indicates how the function is to be validated. The pre-validation information and post-validation information (e.g., validation functions, statements and or data values for comparison) may be directly copied into the validation wrapper logic at object creation time, or the validation wrapper logic (or the object creator) knows how to access this information when needed.

In any event, the pre-validation information may specify, for example, that a validation function or set of validation functions be invoked (step 1004). Instead of or in addition to a validation function or set of validation functions, the pre-validation information alternatively may include a set of statements that are executed to perform validation. For example, the pre-validation information may include a statement that passes validation if the result of some validation function A AND-ed with the result of some validation function B is True.

In this example, the validation is performed resulting in a True (pass) or False (fail) status resulting as represented in the example flow diagram of FIG. 5 at step 1006. In the situation where pre-validation fails, an error is output (e.g., the validation code throws an exception) via step 1008.

In the situation where the pre-validation passes, the original function is run by the wrapper at step 1010. At step 1012 the function's return value(s)/results are obtained. Post-validation, which also may be an invoked validation function, set of validation functions and/or validation statements) then checks the result of the function at steps 1014 and 1016.

In the situation where the post-validation passes, the returned value(s)/result(s) of the function are returned at step 1018. Otherwise an error is thrown (step 1020).

By way of example of a validation check, a variable value may be checked for being the correct type and as having a correct value. For example, an input parameter that needs to be a valid HTTP status code may be checked during pre-validation for being of type number and as having a value that matches an enumeration comprising the set of valid HTTP status codes. A return value may need to be a number between 0 and 100; type checking for a number along with having a value that falls within the specified range is thus performed during post validation. As can be readily appreciated, other object parts such as property setters and getters, events, constructors and so forth may be similarly type checked, value checked and so forth for validation, (although the concept of pre-validation and post-validation may not apply, such as if checking to see whether a property value is a string before any part of the object executes).

It should be noted that the validation system described herein allows for complex validations, e.g., using Boolean operators such as AND and OR. For example, one function may perform type checking, with its result AND-ed with another function's result that determines whether a value matches an enumeration (or falls within a range and so on—basically anything a developer specifies); only if both are True is the True result returned in this example. A property setter may, for example, set a property as a number value OR a string value (but not, for example, a Boolean type, null type, undefined type or symbol type); validation thus may check that the value to be set is a number value OR a string value, with True returned if any one (or both) is True.

As can be seen, described is a system for ensuring that the files in a project are uniform in functionality and format, and have the proper setup/teardown or definition syntax. Using the generation of related template files process does most of this detailed work with a single command.

One or more aspects are directed towards generating a source code template file and a document template file from corresponding data associated with a base class, and registering a source code file comprising an edited version of the source code template file and a document file comprising an edited version of the document template file. Also described is using the source code file to instantiate an object and validating at least part the object based upon validation information in the document file during runtime execution of the object.

A test code template file may be generated from a corresponding test data associated with the base class. A test code file, comprising an edited version of the test code template file, may be registered. The test code file may be used to test an object instantiated from a class corresponding to the source code file. Testing may include mocking out at least one other object.

Generating the source code template file from corresponding data associated with a base class may include generating the source code template file from a base class source code template file and/or from a copy of an edited version of the base class source code template file, including processing the copy into the source code template file. Generating the document template file from corresponding data associated with a base class may include generating the document template file from a base class document template file and/or from a copy of an edited version of the base class document template file, including processing the copy into the document template file.

Validating at least part the object may include validating one or more input parameters to a function of the object, and validating one or more return values returned by the function. Validating at least part the object may include invoking at least one validation function identified in the validation information in the document file.

Registering the source code file may include performing at least one registration validation operation on information in the source code file. Registering the source code file may include including a suffix corresponding to a source code file version within a name associated with the source code file.

One or more aspects are directed towards a templated file generator that is included in or coupled to a document system. The templated file generator generates a related source code template file, document template file and test template file from a set of data associated with to another class registered with the document system. The document system registers a source code file comprising an edited version of the source code template file, a document file comprising an edited version of the document template file, and a test file comprising an edited version of the test template file.

An object-oriented programming system may be included in or coupled to the document system, in which the object-oriented programming system instantiates an object from a class corresponding to the source code file, and determines whether to wrap at least part the object with validation logic based upon condition data accessed by the object-oriented programming system. If the object-oriented programming system determines that at least part of the object is to be wrapped with validation logic, information maintained in the document file is used to validate the at least part of the object during runtime execution of the object.

Information in the test file may be used to test the object during runtime execution of the object. The document system may validate the source code file to via at least one registration validation operation.

One or more aspects are directed towards instantiating an object from a class corresponding to a source code file, and testing the object during runtime, including accessing a test file to determine test-related information. Also described herein is validating the object during runtime, including using validation information maintained in a document file associated with the object.

At least part of the object may be wrapped with validation wrapper logic used in validating the object during runtime. A validation function may be executed via the validation wrapper logic, in which the validation function is specified in the validation information maintained in the document file.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
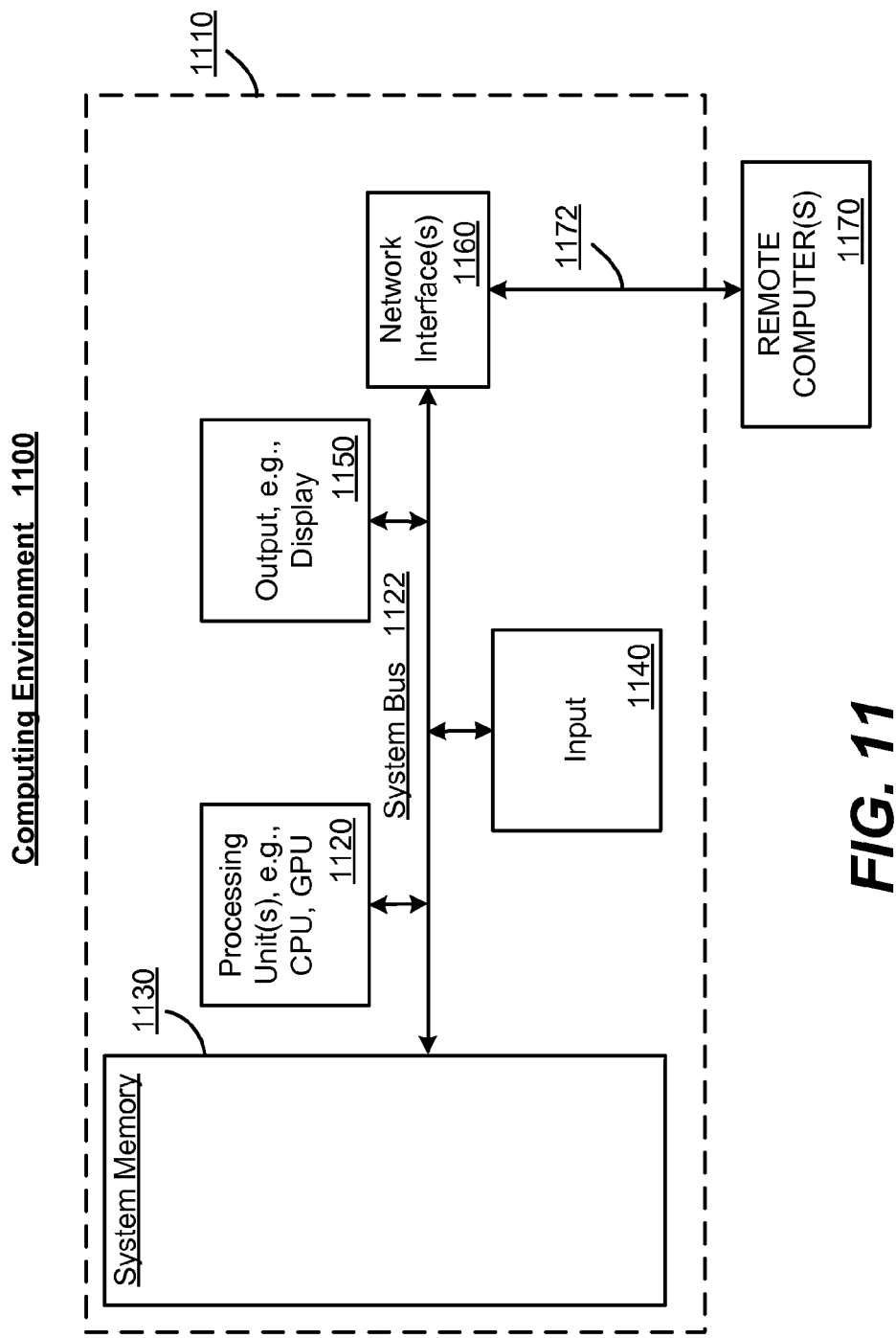
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
generating, by a system comprising a processor, based on data associated with class information including a base class registered with a document system that manages file relationships:
a source code template file corresponding to an object,
a test code template file related to the source code template file based on corresponding test data associated with the base class,
a document template file related to the source code template file, wherein the source code template file, the document template file, and the test code template file are distinct files;
attempting to register, in the document system, a source code file comprising an edited version of the source code template file, a test code file comprising an edited version of the test code template file, and a document file comprising an edited version of the document template file, wherein attempting to register the source code file comprises performing validation on the source code file, where the validation comprises a plurality of validation tests based on information in the test code file and at least one of the source code file or the document file;
in response to the validation passing a subset of the plurality of validation tests, registering the source code file in the document system as not validated, wherein the subset comprises at least one of the plurality of validation tests and less than all of the plurality of validation tests; and
in response to the validation passing the plurality of validation tests, registering the source code file in the document system as validated.

2. The method of claim 1, further comprising, using the test code file to test an object instantiated from a class corresponding to the source code file.

3. The method of claim 2, wherein the using the test code file to test the object instantiated from the class corresponding to the source code file comprises mocking out at least one other object.

4. The method of claim 1, wherein the generating the source code template file comprises generating the source code template file from a base class source code template file.

5. The method of claim 1, wherein the generating the source code template file comprises generating the source code template file from a copy of an edited version of the base class source code template file, including processing the copy into the source code template file.

6. The method of claim 1, wherein the generating the document template file comprises generating the document template file from a base class document template file.

7. The method of claim 1, wherein the generating the document template file comprises generating the document template file from a copy of an edited version of the base class document template file, including processing the copy into the document template file.

8. The method of claim 1, wherein the performing the validation comprises validating one or more input parameters to a function of the object, and validating one or more return values returned by the function.

9. The method of claim 1, wherein the performing the validation comprises invoking at least one validation function identified in the validation information in the document file.

10. The method of claim 1 wherein the registering the source code file comprises including a suffix corresponding to a source code file version within a name associated with the source code file.

11. The method of claim 1, further comprising, generating a different version of the source code template file in conjunction with generating the source code template file, wherein the different version of the source code template file has at least one different attribute relative to the source code template file.

12. A non-transitory computer-readable medium having instructions stored thereon that, in response to execution, cause a system including a processor to perform operations comprising:
 generating a source code template file, a document template file, and a test template file based on a set of data associated with a class registered with a document system that manages file relationships, wherein the source code template file, the document template file, and the test template file are distinct files;
 attempting to register, in the document system:
  a source code file comprising an edited version of the source code template file,
  a document file comprising an edited version of the document template file; and
  a test file comprising an edited version of the test template file;
 wherein attempting to register the source code file comprises performing validation on the source code file, wherein the validation comprises a plurality of validation tests based on information in the test file and at least one of the source code file or the document file;
 in response to the validation passing a subset of the plurality of validation tests, registering the source code file, in the document system as not validated, wherein the subset comprises at least one of the plurality of validation tests and less than all of the plurality of validation tests; and
 in response to the validation passing the plurality of validation tests, registering the source code file in the document system as validated.

13. The non-transitory computer-readable medium of claim 12, the operations further comprising wrapping at least part of the object with validation wrapper logic used in validating the object during runtime.

14. The non-transitory computer-readable medium of claim 13, the operations further comprising executing a runtime validation function via the validation wrapper logic, the runtime validation function specified in the validation information maintained in the related document file.

15. A system comprising:
 a processor; and
 a memory that stores executable instructions, which, when executed by the processor, facilitate performance of operations, comprising:
  generating a source code template file, a document template file, and a test template file based on a set of data associated with a class registered with a document system that manages file relationships, wherein the source code template file, the document template file, and the test template file are distinct files;
  attempting to register, in the document system:
   a source code file comprising an edited version of the source code template file,
   a document file comprising an edited version of the document template file; and
   a test file comprising an edited version of the test template file;
  wherein attempting to register the source code file comprises performing validation on the source code file, where the validation comprises a plurality of validation tests based on information in the test file and at least one of the source code file or the document file;
  in response to the validation passing a subset of the plurality of validation tests associated with the source code file, registering the source code file in the document system as not validated, wherein the subset comprises at least one of the plurality of validation tests and less than all of the plurality of validation tests; and
  in response to the validation passing the plurality of validation tests, registering the source code file in the document system as validated.

16. The system of claim 15, further comprising instantiating the object from a class corresponding to the source code file, and determining whether to wrap at least part of the object with validation logic based upon condition data.

17. The system of claim 15, further comprising instantiating the object from a class corresponding to the source code file, wrapping at least part the object with validation logic based upon condition data, and using information maintained in the document file to validate the at least part of the object during runtime execution of the object.

18. The system of claim 15, further comprising, instantiating the object from a class corresponding to the source code file and validating at least part of the object during runtime execution of the object.

19. The system of claim 15, further comprising, instantiating the object from a class corresponding to the source code file, and using information in the test file to test the object during runtime execution of the object.

* * * * *